United States Patent [19]

Pakur et al.

[11] 4,050,497

[45] Sept. 27, 1977

[54] BELT FOR BELTED TIRES AND METHOD OF MAKING SAME

[75] Inventors: Henryk Pakur, Buckeburg; Reinhard Tiemann, Hemmingen, both of Germany

[73] Assignee: Continental Gummi-Werke Aktiengesellschaft, Hannover, Germany

[21] Appl. No.: 665,951

[22] Filed: Mar. 11, 1976

[30] Foreign Application Priority Data

Mar. 12, 1975 Germany .............................. 2510752

[51] Int. Cl.² .............................................. B60C 9/18
[52] U.S. Cl. .......................... 152/361 FP; 156/128 R
[58] Field of Search ..... 152/361 R, 361 FP, 361 DM; 156/128 R

[56] References Cited

U.S. PATENT DOCUMENTS 3,559,714  2/1971  Verdier ......................... 152/361 DM

FOREIGN PATENT DOCUMENTS 2,201,623  7/1972  Germany ........................... 152/361 R
2,361,944  6/1975  Germany ........................... 152/361 R

*Primary Examiner*—Drayton E. Hoffman
*Attorney, Agent, or Firm*—Walter Becker

[57] ABSTRACT

A belt for a belted tire with an inner continuous layer and with an outer layer divided into two marginal sections and an intermediate section. The strength carriers of the inner belt layer extend over the width thereof in one direction and at a first angle with regard to the circumferential direction of the belt. The strength carriers of the intermediate section of the outer layer extend only over the width of the intermediate section and at the same angle as the first mentioned angle but in an opposite direction to the strength members of the inner belt layer. The strength members of the marginal sections extending in the same direction as the strength members of the intermediate section but at a smaller angle with regard the circumferential direction of the belt than the angle at which the strength members of the outer belt layer extend. The marginal areas of the inner belt layer as well as the marginal sections of the outer belt layer folded over the adjacent areas of the intermediate belt section of the outer belt layer. Prior to applying the belt to the carcass of a raw tire, the diameter of the belt is extended by from 5 to 25%.

3 Claims, 7 Drawing Figures

BELT FOR BELTED TIRES AND METHOD OF MAKING SAME

The present invention relates to a method of producing belted tires, especially pneumatic vehicle tires, in which the belt consists of pull-resistant parallel thread-like strength carriers, for instance of steel cables, which in one layer extend at an incline in one direction and in the next layer extend at an incline in the opposite direction. Such belts which henceforth will be called two-angle belts have the advantage that they are pull-resistant in circumferential direction of the tire and stabilize the entire tire body greatly against lateral forces.

German Offenlegungsschrift No. 2430495 discloses a method of making belted tires, especially pneumatic tires, according to which the belt which is separately made, and prior to being placed upon the pre-curved carcass is subjected to a stretching operation so as to increase the diameter of the belt. This increase in diameter is considerably greater than the increase in diameter, the so-called residual elevation (Resterhebung) required for molding the tread strip zone in the vulcanizing mold. This increase in diameter obtained by said stretching operation amounts to from 5 to 25%, preferably to form 10 to 20%.

It is another object of the present invention to provide belted tires of the above described general character, in which, however, the belt has width sections, in other words strips arranged adjacent to each other, the strength carriers of which form different angles with the circumferential direction of the tire.

It is another object of this invention to provide a belted tire as set forth in the preceding paragraph which will assure that undesired mutual influences of the layers of the belt on the one hand and of the carcass on the other hand will not occur.

These and other objects and advantages of the invention will appear more clearly from the following specification in connection with the accompanying drawing, in which.

Figure 1:
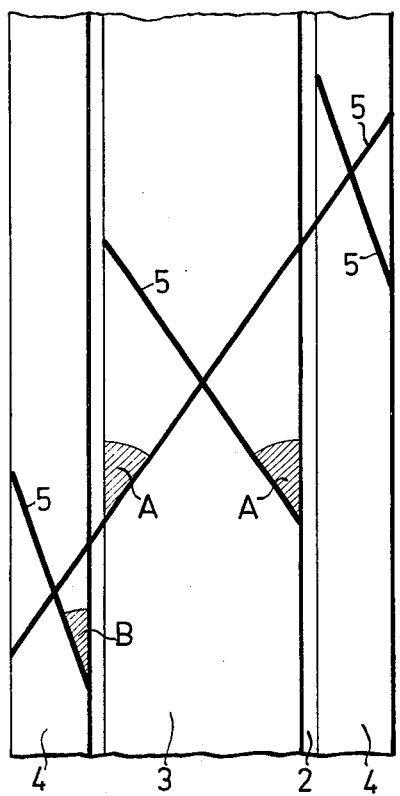
FIG. 1 is a partial top view of a belted tire according to the invention.
Figure 3:
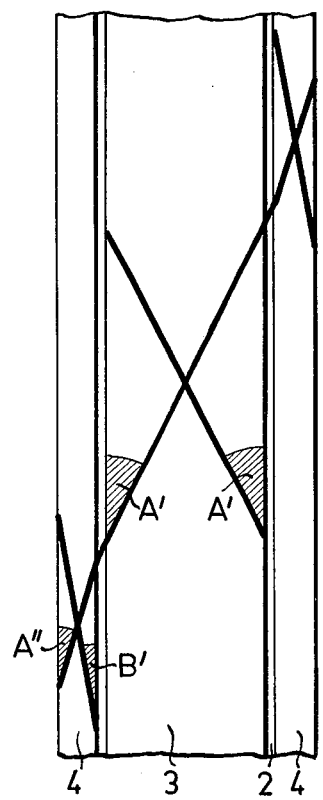
FIG. 3 is a partial top view of a belted tire according to the invention after its diameter has been increased.

It has become known to transform belt layers together with the carcass in such a way that due to an increase in the diameter, the strength carriers will extend at a certain angle with regard to the circumferential direction of the tire. The occurring change in the angle, however, brings about that the strength carriers of the carcass radially inwardly of the strength carriers of the belt will be distorted.

The above outlined objects of the present invention have been solved in conformity with the manufacture of belted tires, especially pneumatic vehicle tires, with two-angle belts by composing the belt of or dividing the belt into width sections respectively having their strength carriers extending at different angles and by subjecting the belt prior to being placed upon the carcass to an increase in diameter by stretching.

The present invention makes possible also to produce so-called folded belts. To this end, it is suggested to effect the folding after the belt has been stretched in conformity with the present invention.

Referrin now to the drawing in detail, the belt 1 consists of a continuous lower layer 2, in intermediate upper layer 3, and two upper marginal layers 4. All layers consist of a rubberized cord fabric. The thread-like strength carriers 5 are pull-resistant in their longitudinal direction. If desired, the thread-like strength carries 5 may consist of steel cables or of other pull-resistant material.

For reasons of a simplified illustration, the strength carriers 5 for each layer are illustrated merely by one strength carrier. The strength carriers 5 form cross connections. More specifically, the strength carriers 5 of layer 2 are arranged so as to ascend toward the right (with regard to the drawing) at an angle A; the strength carriers 5 of the layers 3 and 4 ascend toward the left. While the strength carriers 5 of layer 3 are likewise arranged at the angle A, the strength carriers 5 of layer 4 are arranged at a smaller angle B with regard to the tire circumferential direction.

The belt 1 is built up in customary manner on a cylindrical drum. Thi drum according to the invention being increased in diameter and during this increase the belt diameter increases by from 10 to 15%. During this increase in diameter the angles A decrease and, more specifically, these angles within the region of the layer 3 will decrease to the angle A'. Within the region of the layers 4, the strength carriers 5 describe with the tire circumferential direction the angles B' and A" respectively. Due to the difference in the angles A and B, an angling off of the strength carriers 5 of layers 2 will occur within the region of the layers 4.

Figure 5:
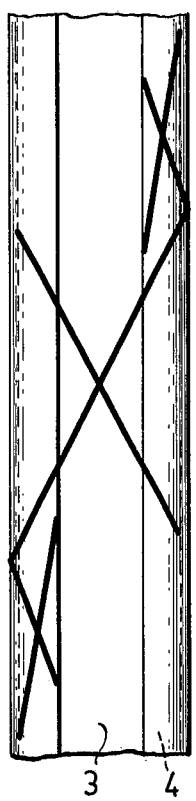
FIG. 5 is a partial top view of the tire belt after its marginal portions have been folded over.
Figure 2:
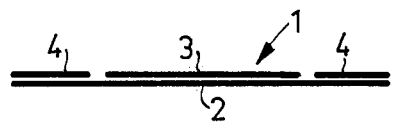
FIG. 2 represents a cross section through the belt of FIG. 1.
Figure 4:
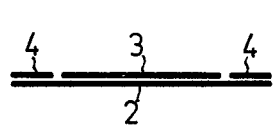
FIG. 4 shows a cross section through the tire belt according to FIG. 3.
Figure 6:
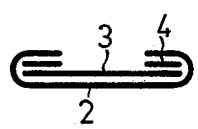
FIG. 6 shows a cross section through the belt of FIG. 5.
Figure 7:
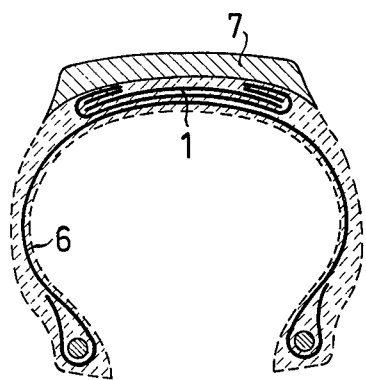
FIG. 7 represents a finished raw belted tire according to the invention with a belt as shown in FIGS. 5 and 6.

Thereupon a folding of the belt is effected by folding over the belt 1 within the width of the layers 4, and more specifically, by folding the belt in the width of layer 4 inwardly upon the layer 3. As a result thereof the threads will extend in conformity with FIG. 5, and a cros section is obtained in comformity with FIG. 6.

The thus prepared belt is placed upon the preformed carcass 6. After the tread strip 7 has been applied and possibly further rubber strips have been applied, the raw tire is inserted into the vulcanizing mold where the tire by the application of an inner pressure is subjected only to a very slight increase in diameter. More specifically, the increase in diameter is only so slight that the tire will undergo the so-called residual elevation. (Resterhebung) so that the tire profile can be formed and the tire can be molded and vulcanized. This residual elevation is, however, extremely slight. It amounts only to about from 1 to 2%. Thi increase in diameter does not bring about any further material deformation of the belt and therefore does not produce an undesired influence upon the carcass 6.

It is, of course, to be understood that the present invention is, by no means, limited to the speciic showing in the drawing, but also comprises any modificiations within the scope of the appended claims.

What we claim is:

1. A method of preparing a belt for a belted tire which includes the steps of: building up an annular inner belt layer with first strength carriers extending over the width of said inner belt layer at a first angle and in a first direction with regard to the circumferential direction of said belt, building up an annular outer belt layer with second srength carriers extending in a direction opposite to said first direction and dividing the width of said outer belt layer into two marginal sections and an intermediate section with the latter having its strength carriers extending over the width of said intermediate section at the same angle as said first angle and with the strength carriers of said marginal sections extending only over the respective marginal section but at a second angle less than said first angle, superimposing said outer belt layer upon said inner belt layer, extending the diameter of the thus built up belt by from 5 to 25%, and folding said marginal sections and the outer marginal areas of said inner belt layer over the adjacent areas of said intermediate section.

2. A belt for a belted tire which comprises an annular inner belt layer with first strength carriers extending over the width of said inner belt layer at a first angle and in a first direction with regard to the circumferential direction of said belt, an annular outer belt layer superimposed upon said inner belt layer with second strength carriers extending in a direction opposite to said first direction, the width of said outer belt layer being divided into two marginal sections and an intermediate section therebetween, said intermediate section having its strength carrier extending over the width of said intermediate section at the same angle as said first angle, and the strength carriers of said marginal sections extending only over the respective marginal section but at a second angle less than said first angle, said marginal sections and the outer marginal areas of said inner belt layer being folded over adjacent areas of said intermediate section.

3. A method of making a belted tire which includes the steps of: preparing a belt by building up an annular inner belt layer with first strength carriers extending over the width of said inner belt layer at a first angle and in a first direction with regard to the circumferential direction of said belt, building up an annular outer belt layer with second strength carriers extending in a direction opposite to said first direction and dividing the width of said outer belt layer into two marginal sections and an intermediate section with the latter having its strength carriers extending over the width of said intermediate section at the same angle as said first angle and with the strength carriers of said marginal section extending only over the respective marginal section but at a second angle less than said first angle, superimposing said outer belt layer upon said inner belt layer, extending the diameter of the thus built up belt from 5 to 25%, and folding said marginal sections and the outer marginal areas of said inner belt layer over the adjacent areas of said intermediate section, preparing a precurved cacass, placing the said belt with the outer marginal areas of said inner layer folded over the marginal sections of said outer belt layer upon said carcass and molding and vulcanizing the thus formed tire.

* * * * *